US012596421B2

(12) United States Patent
Wang et al.

(10) Patent No.: US 12,596,421 B2
(45) Date of Patent: Apr. 7, 2026

(54) COMPUTER ARCHITECTURE SYSTEM AND CONTROL METHOD THEREFOR

(71) Applicant: KHADAS TECHNOLOGY CO., LTD., Shenzhen (CN)

(72) Inventors: Fengfeng Wang, Shenzhen (CN); Weiping Liu, Shenzhen (CN)

(73) Assignee: KHADAS TECHNOLOGY CO., LTD., Shenzhen (CN)

( * ) Notice: Subject to any disclaimer, the term of this patent is extended or adjusted under 35 U.S.C. 154(b) by 152 days.

(21) Appl. No.: 18/315,525

(22) Filed: May 11, 2023

(65) Prior Publication Data

US 2024/0201739 A1 Jun. 20, 2024

(30) Foreign Application Priority Data

Dec. 16, 2022 (CN) .......................... 202211624525.3

(51) Int. Cl.
*G06F 1/30* (2006.01)

(52) U.S. Cl.
CPC ................................... *G06F 1/305* (2013.01)

(58) Field of Classification Search
CPC ....................................................... G06F 1/305
See application file for complete search history.

(56) References Cited

U.S. PATENT DOCUMENTS

| | | | |
|---|---|---|---|
| 9,291,302 B2 * | 3/2016 | Iwaki ..................... | F16M 13/02 |
| 2005/0050236 A1 | 3/2005 | Zeryck et al. | |
| 2009/0001932 A1 * | 1/2009 | Kamijo ................... | H02J 7/731 |
| | | | 320/108 |
| 2016/0198477 A1 * | 7/2016 | Takagi .............. | H04W 72/0446 |
| | | | 370/329 |
| 2018/0025033 A1 | 1/2018 | Kjelland et al. | |
| 2019/0050501 A1 | 2/2019 | Grussing | |
| 2021/0303942 A1 * | 9/2021 | Watanabe .............. | G06K 15/16 |

* cited by examiner

*Primary Examiner* — Henry Tsai
*Assistant Examiner* — John B Roche
(74) *Attorney, Agent, or Firm* — Che-Yang Chen

(57) ABSTRACT

The present disclosure belongs to the technical field of computers, in particular relates to a novel computer architecture system and a control method therefor. The computer architecture system includes a host, wherein the host includes a CPU master control unit, an EC unit, a first interface unit and a battery; the EC unit is electrically connected to the CPU master control unit and the first interface unit, respectively; and the battery is electrically connected to the CPU master control unit.

10 Claims, 2 Drawing Sheets

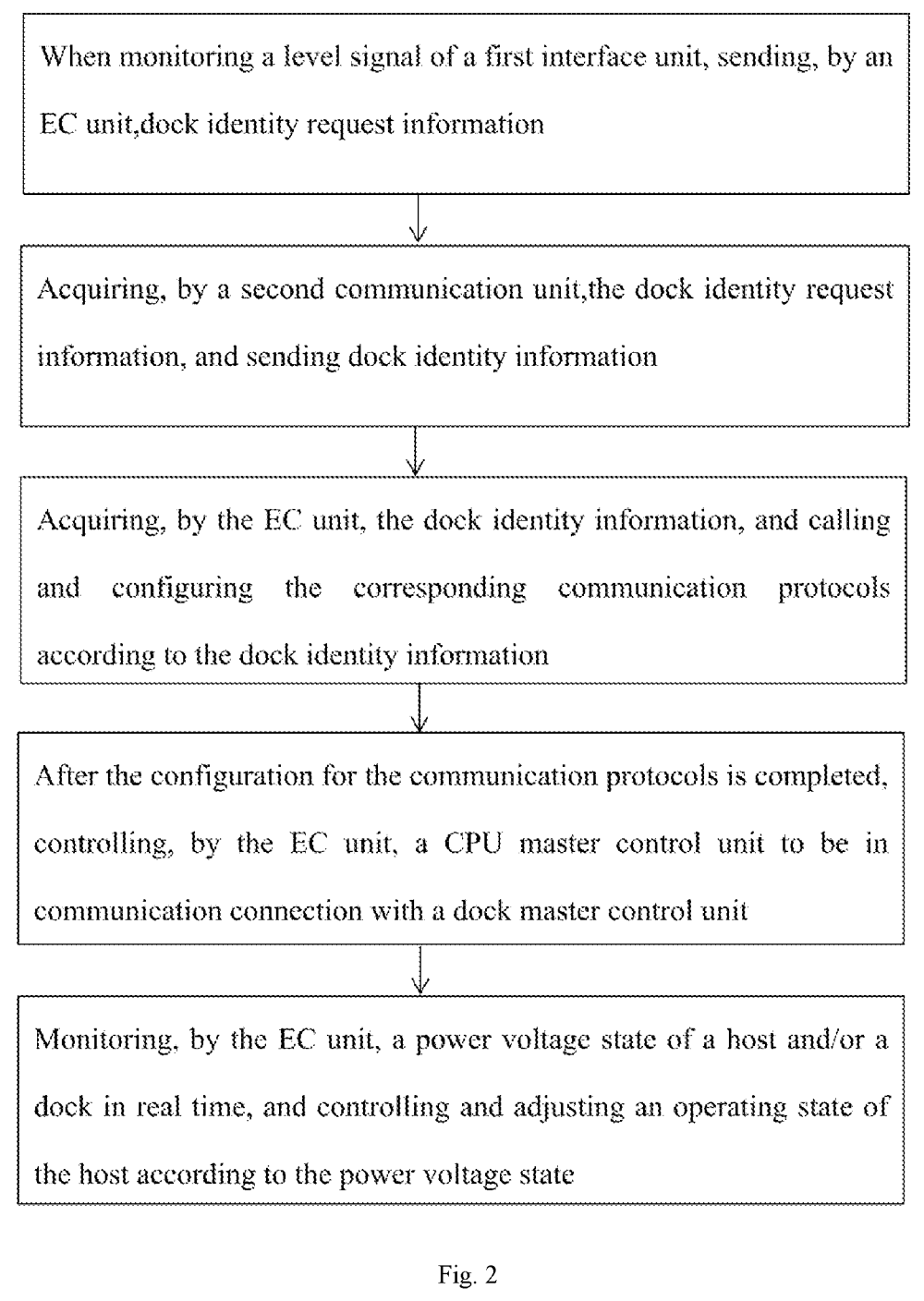

When monitoring a level signal of a first interface unit, sending, by an EC unit,dock identity request information Acquiring, by a second communication unit,the dock identity request information, and sending dock identity information Acquiring, by the EC unit, the dock identity information, and calling and configuring the corresponding communication protocols according to the dock identity information After the configuration for the communication protocols is completed, controlling, by the EC unit, a CPU master control unit to be in communication connection with a dock master control unit Monitoring, by the EC unit, a power voltage state of a host and/or a dock in real time, and controlling and adjusting an operating state of the host according to the power voltage state

Fig. 2

COMPUTER ARCHITECTURE SYSTEM AND CONTROL METHOD THEREFOR

TECHNICAL FIELD

The present disclosure belongs to the technical field of computers, in particular relates to a novel computer architecture system and a control method therefor.

BACKGROUND ART

At present, main computers include a desktop computer, a mini-host computer, a notebook computer, a 2in1 (two-in-one) computer and a tablet computer. Each product form is designed for different application scenarios to meet the best use experience of a user in the corresponding scenarios.

However, in fact, there is usually a demand on scenario switching in a process that a computer is used by a person, for example, the desktop computer focusing on performances is required to be used on a desk, and the notebook or 2in1 product form focusing on portability is required to be used in a mobile scenario. At present, there has been no product form that can better meet a user demand for scenario switching during actual use on the market.

At present, the desktop computer and a Mini PC are both large in size so as to be inconvenient to migrate and move. Particularly, the desktop computer is relatively troublesome in replacement and is also difficult to clear and maintain in an office area.

If a user of the desktop computer in the office area wants to have a meeting in a meeting room, he needs to copy data in a U disk and plug the U disk into a desktop computer in the meeting room for processing, or needs to copy the data in a notebook computer, which undoubtedly increases many tedious processes and wastes more time.

At present, an x86 desktop computer or the Mini PC has not been provided with a built-in battery, and even the smallest Mini PC needs to be moved after being shut down, this defect makes the Mini PC unable to achieve an attribute of convenient mobile office from point to point. For example, the computer needs to be shut down and then restarted for operation when being moved from a desk to a meeting room, from an office to a home, from an office to a coffee shop, from an office to the outside, etc. so as to be troublesome in operation and extremely poor in experience.

Furthermore, at present, the x86 desktop computer or the Mini PC can only be used as a single computer or used by connecting a display and a U disk by a standard connector, but cannot be well expanded, and when it needs to be replaced to another position, all external accessories such as a power source, a mouse and a keyboard need to be swapped and plugged again, so that extremely poor experience is achieved.

SUMMARY OF THE INVENTION

For the above-mentioned problems, the present disclosure provides a novel computer architecture system, the computer architecture system including a host, wherein the host includes a CPU (central processing unit) master control unit, an EC (embedded controller) unit, a first interface unit and a battery; the EC unit is electrically connected to the CPU master control unit and the first interface unit, respectively; and the battery is electrically connected to the CPU master control unit;

the CPU master control unit is configured to acquire input data and perform calculation processing according to the input data to generate output data; and send the output data;

the EC unit is configured to receive a first level signal and send dock identity request information; and acquire and recognize dock identity information, and call and configure communication protocols according to the dock identity information;

the first interface unit is configured to be connected to a dock to perform data and/or power signal transmission; and the battery is configured to supply a temporary working voltage to the host.

Further, the computer architecture system further includes the dock;

the dock includes a second communication unit, a dock master control unit, a third interface unit and a fourth interface unit; the third interface unit, the second communication unit, the dock master control unit and the fourth interface unit are electrically connected in sequence; the third interface unit is configured to be connected to the first interface unit of the host to perform data and/or power signal transmission;

the second communication unit is configured to store the dock identity information; receive the dock identity information and send the dock identity information according to the dock identity request information;

the dock master control unit is configured to acquire an input signal, generate and send input data according to the input signal; and receive output data, and generate and send an output signal according to the output data; and the fourth interface unit is configured to be connected to an external device to transmit the input signal and/or the output signal and/or the power voltage.

Further, the external device includes one or more of a first external power source, a mouse, a keyboard, a display and an audio.

Further, the EC unit includes a protocol storage unit and a first communication unit;

the protocol storage unit is electrically connected to the first communication unit, and the first communication unit is connected to the first interface unit and the CPU master control unit, respectively;

the protocol storage unit is configured to store the communication protocols; and the first communication unit is configured to acquire and recognize the dock identity information, and call and configure the communication protocols according to the dock identity information.

Further, the EC unit is further configured to monitor a power voltage state of the host and/or the dock in real time; and control and adjust an operating state of the host according to the power voltage state.

Further, the host further includes a second interface unit connected to the CPU master control unit and configured to be connected to a second external power source.

The present disclosure further provides a control method for a novel computer architecture system, wherein the control method includes:

when monitoring a level signal of a first interface unit, sending, by an EC unit, dock identity request information;

acquiring, by a second communication unit, the dock identity request information, and sending dock identity information;

acquiring, by the EC unit, the dock identity information, and calling and configuring corresponding communication protocols according to the dock identity information;

after the configuration for the communication protocols is completed, controlling, by the EC unit, a CPU master control unit to be in communication connection with a dock master control unit; and monitoring, by the EC unit, a power voltage state of a host and/or a dock in real time, and controlling and adjusting an operating state of the host according to the power voltage state.

Further, the step of controlling and adjusting an operating state of the host according to the power voltage state includes:

if the host is not in communication connection with the dock, controlling, by the EC unit, a battery to supply power, and controlling the CPU master control unit to be in a dormant or sleep mode;

if the host is in communication connection with the dock, and it is monitored by the EC unit that the dock is connected with a first external power source, at the moment, controlling, by the EC unit, the first external power source to supply power to the host and be capable of charging the battery; and if the host is in communication connection with the dock, and it is monitored by the EC unit that the dock is not connected with the first external power source, at the moment, controlling, by the EC unit, the battery to supply power to the host, cutting off power output to the dock, and controlling the CPU master control unit to be in the dormant or sleep mode.

Further the step of controlling and adjusting an operating state of the host according to the power voltage state includes:

if the host is not in communication connection with the dock, and it is monitored by the EC unit that the host is connected with a second external power source, at the moment, controlling, by the EC unit, the second external power source to supply power to the host and be capable of charging the battery;

if the host is in communication connection with the dock, and it is monitored by the EC unit that the host is connected with the second external power source and the dock is not connected with the first external power source, at the moment, controlling, by the EC unit, the second external power source to supply power to the host and the dock and be capable of charging the battery;

if the host is not connected with the second external power source and the dock is connected with the first external power source after the host is in communication connection with the dock, at the moment, controlling, by the EC unit, the first external power source to supply power to the host and the dock and be capable of charging the battery; and if the host is connected with the second external power source and the dock is connected with the first external power source after the host is in communication connection with the dock, at the moment, controlling, by the EC unit, the first external power source or the second external power source to supply power to the host and the dock and be capable of charging the battery.

Further the step of controlling and adjusting an operating state of the host according to the power voltage state includes:

if the host is in communication connection with the dock, and it is monitored by the EC unit that the host is connected with the second external power source and/or the dock is connected with the first external power source and output voltages of all the external power sources are lower than a working voltage, controlling, by the EC unit, the battery to supply power to the host, cutting off power output to the dock, and controlling the CPU master control unit to be in the dormant or sleep mode.

The present disclosure has the beneficial effects that:

1. according to the present disclosure, by integrating the EC unit in the host, various communication protocols are stored in the protocol storage unit, the first communication unit can call and configure the corresponding communication protocols according to different types of docks and can rapidly recognize and connect the various types of docks, so that the host is applicable to various docks, application scenarios of the computer architecture system are enriched, and the experience is enhanced;

2. according to the present disclosure, a connector adopted by the first interface unit and the third interface unit supports the transmission of various signals such as a PCIex8 signal, a USB3.0 signal, a USB2.0 signal, a DP signal, an HDMI signal and a power signal. The computer architecture system can selectively output the signals according to the types of the docks and the types of the communication protocols configured by the host. Furthermore, the connector supports hot swapping/plugging, which creates the feasibility for the multi-scenario and multifunctional expansion of the host; and 3. when there is no external power source for supplying power or the power voltage cannot meet a demand for electric power of the computer architecture system, the EC unit cuts off the power output to the host, the battery supplies power to the CPU master control unit, and the CPU master control unit is controlled to be in the dormant or sleep mode, so that not only can the power loss caused by restarting the host when the application scenarios are switched be avoided to achieve energy conservation and environment protection effects, but also the safety is also guaranteed when the host is in hot swapping/plugging connection with a dock. The expansion difficulty of the host is lowered, the application scenarios are enriched, and the experience is enhanced.

Other characteristics and advantages of the present disclosure will be further explained in the following description, and partly become self-evident therefrom, or be understood through implementation of the present disclosure. The objectives and advantages of the present disclosure will be achieved through a structure specifically pointed out in the description, claims and the accompanying drawings.

BRIEF DESCRIPTION OF THE DRAWINGS

To describe the technical solutions in the embodiments of the present disclosure or the prior art more clearly, the accompanying drawings required for describing the embodiments or the prior art will be briefly introduced below. Apparently, the accompanying drawings in the following description show only some embodiments of the present disclosure, and those of ordinary skill in the art may still derive other accompanying drawings from these accompanying drawings without creative efforts.

FIG. 2 shows a schematic process diagram of a control method for a computer architecture system in an embodiment of the present disclosure.

DETAILED DESCRIPTION OF THE INVENTION

Figure 1:
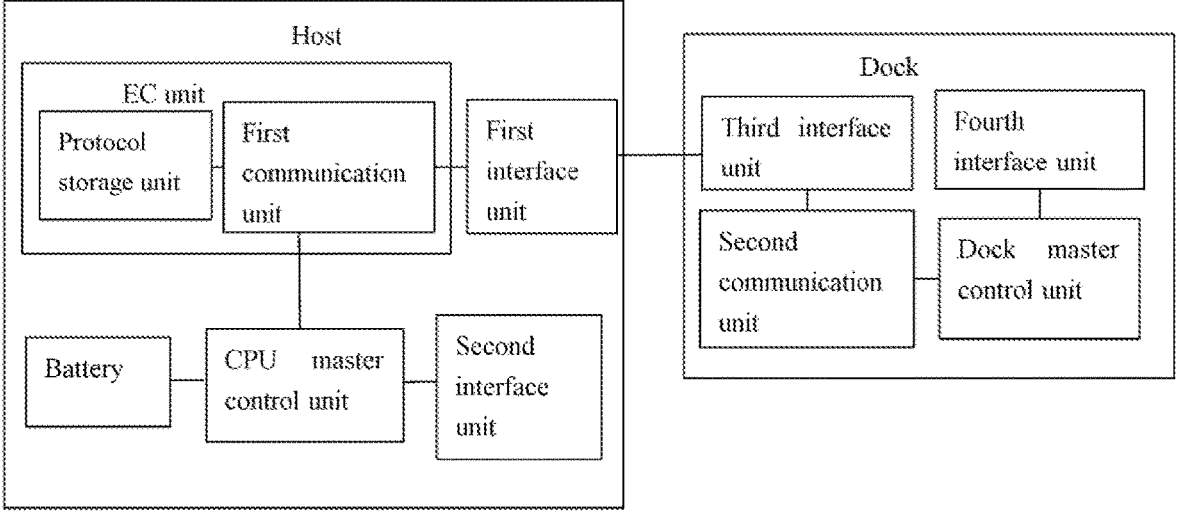
FIG. 1 shows a schematic structural diagram of a computer architecture system in an embodiment of the present disclosure.

In order to make objectives, technical solutions and advantages of the embodiments of the present disclosure clearer, the technical solutions in the embodiments of the present disclosure will be described clearly and completely below in conjunction with the accompanying drawings in the embodiments of the present disclosure. Apparently, the described embodiments are a part of the embodiments of the present disclosure, not all the embodiments. Based on the described embodiments of the present disclosure, all other embodiments obtained by those of ordinary skill in the art without creative work shall fall within the protective scope of the present disclosure.

An embodiment of the present disclosure provides a novel computer architecture system, as shown in FIG. 1, the computer architecture system includes a host.

The host includes a CPU master control unit, an EC unit, a first interface unit and a battery; the EC unit is electrically connected to the CPU master control unit and the first interface unit, respectively; and the battery is electrically connected to the CPU master control unit.

The CPU master control unit is configured to acquire input data and perform calculation processing according to the input data to generate output data; and send the output data.

The EC unit is configured to receive a first level signal and send dock identity request information; and acquire and recognize dock identity information, and call and configure communication protocols according to the dock identity information.

The first interface unit is configured to be connected to a dock to perform data and/or power transmission.

The battery is configured to supply a temporary working voltage to the host.

Specifically, the temporary working voltage provided by the battery only meets a working voltage when the CPU master control unit is in a dormant or sleep mode.

Further, the computer architecture system further includes the dock. The dock includes a second communication unit, a dock master control unit, a third interface unit and a fourth interface unit; and the third interface unit, the second communication unit, the dock master control unit and the fourth interface unit are electrically connected in sequence.

The third interface unit is configured to be connected to the first interface unit of the host to achieve data and/or power signal transmission of the host and the dock.

The second communication unit is configured to store the dock identity information; receive the dock identity information and send the dock identity information according to the dock identity request information.

The dock master control unit is configured to acquire an input signal, generate and send input data according to the input signal; and further receive output data, and generate and send an output signal according to the output data.

The fourth interface unit is configured to be connected to an external device to transmit the input signal and/or the output signal and/or the power voltage.

Exemplarily, after the first interface unit is connected to the third interface unit, the EC unit sends an identity information request signal; the second communication unit acquires the identity information request signal and sends the dock identity information according to the identity information request signal; the EC unit acquires the dock identity information and calls the corresponding communication protocols according to the dock identity information to perform protocol configuration; and after the configuration of the communication protocols is completed, the CPU master control unit is in communication connection with the dock master control unit.

The dock is connected to each external device by the fourth interface unit, and the external device includes, but is not limited to a mouse, a keyboard, a display, an audio and a first external power source.

An input device generates an input signal which is transmitted to the dock master control unit by the fourth interface unit. The input signal is encoded by the dock master control unit to generate input data, and the input data is sent to the CPU master control unit.

The CPU master control unit serving as an operation and control core of the computer architecture system is a final execution unit for information processing and program operation. The input data is acquired and processed by the CPU master control unit to generate output data; and the output data is sent to the dock master control unit. The output data is acquired and decoded by the dock master control unit to generate an output signal; and the output signal is sent to an output device by the fourth interface unit so as to be executed. According to the present disclosure, by integrating the EC unit in the host, various docks can be rapidly recognized and connected; and during scenario conversion, by the built-in battery, it is ensured that the host keeps operating normally under the condition that no external power source is provided. The expansion difficulty of the host is lowered, application scenarios are enriched, and the experience is enhanced.

Specifically, the EC unit includes a protocol storage unit and a first communication unit. The protocol storage unit is electrically connected to the first communication unit, and the first communication unit is connected to the first interface unit and the CPU master control unit, respectively.

The protocol storage unit is configured to store the communication protocols such as a handshake protocol and a device identification legitimacy protocol.

The first communication unit is configured to acquire and recognize the dock identity information, and call and configure the communication protocols according to the dock identity information.

For example, the docks include, but are not limited to a Mind Dock, a Mind Graphics GPU dock, a Mind Talk dock, a Mind xPlay dock and a Mind Studio Display dock.

Exemplarily, the Mind Dock belongs to a basic desktop office unit, and data interaction between the host and the Mind Dock is achieved by the first interface unit and the third interface unit. Transmission of signals such as an HDMI signal, a DP signal, a USB-A signal and a SD signal may be performed between the host and the Mind Dock. The fourth interface unit on the Mind Dock may also be connected to an audio output device such as a loudspeaker and a 3.5 mm headphone. The host, the Mind Dock and the output device are combined into a complete calculation, display and multimedia system.

Exemplarily, the host transmits a PCIex8 signal, an HDMI signal, a DP signal, a USB3.0 signal and a USB2.0 signal to the Mind Graphics dock by the first interface unit and the third interface unit. Graphics card acceleration and other signal expansion functions including simultaneous display and multimedia expansion of an HDMI, a DP, a USB-A, an SD card, a loudspeaker and a 3.5 mm headphone jack can be achieved, and a high-computing-power computer and multimedia system is formed. A use demand of a user requiring a rendering performance is met.

Exemplarily, the Mind Talk dock is a dock special for a meeting room. When a user needs to have a meeting in the meeting room by using the host, the host may be taken away from the Mind Dock (in this process, it is unnecessary to cut off a power source or pull up an external device such as a mouse, a keyboard and an HDMI), at the moment, the battery in the host supplies power to ensure that the host is not shut down. When it is detected by the system that an input power source is cut off, the system can automatically enter a sleep/dormant mode, so that power loss is reduced. Then, the host is connected to the Mind Talk dock in the meeting room, and when it is detected by the system that a power source is input, the system is awakened to enter a normal mode, so that seamless switching between office and a meeting environment is achieved. The Mind Talk dock is provided with an HDMI and a DP for video output and is further provided with a multimedia device such as a loudspeaker, a Mic and a camera, so that a meeting mode may be rapidly started.

Exemplarily, a main body of the xPlay dock is a display, and the fourth interface unit thereon may be externally connected to an input/output device such as a mouse and a keyboard. In an environment for external office within a short time, the host may be adsorbed on the xPlay dock, and communication therebetween is achieved by the first interface unit and the third interface unit. The host transmits a DP display signal and a USB signal to the xPlay dock for function expansion, so that switching from a fixed office position to a use scenario for a long-distance temporary business trip is achieved, and it is unnecessary to replace a computer and copy data during switching. The xPlay dock is internally provided with a battery which may further supply power to the host and is combined into a "notebook computer" form.

Exemplarily, a main body of the Mind Studio Display dock is also a display, and the size thereof is greater than that of the xPlay dock. In a team discussion scenario, the host can be directly placed on the Mind Studio Display dock and is connected. The host transmits an HDMI signal, a USB signal, etc. to the Mind Studio Display dock by the first interface unit and the third interface unit, and information sent by the host may be displayed by the external device. The Mind Studio Display dock supports functions such as an audio, a camera and a Mic and is combined into an "all-in-one computer" form.

Various communication protocols are stored in the protocol storage unit, the first communication unit can call and configure the corresponding communication protocols according to the different types of docks, so that the host is applicable to various docks, application scenarios of the computer architecture system are enriched, and the experience is enhanced.

It should be noted that a connector adopted by the first interface unit and the third interface unit supports the transmission of various signals such as a PCIex8 signal, a USB3.0 signal, a USB2.0 signal, a DP signal, an HDMI signal and a power signal. The computer architecture system can selectively output the signals according to the types of the docks and the types of the communication protocols configured by the host. Furthermore, the connector supports hot swapping/plugging, which creates the feasibility for the multi-scenario and multifunctional expansion of the host.

Further, the EC unit is further configured to monitor a power voltage state of the host and/or the dock in real time; and control and adjust an operating state of the host according to the power voltage state.

Specifically, if the host is not connected to the dock, the EC unit controls the battery to supply power, and controls the CPU master control unit to be in the dormant or sleep mode.

If the fourth interface unit of the dock is connected with the first external power source after the host is in communication connection with the dock, the EC unit controls the first external power source to supply power to the host and be capable of charging the battery.

If the fourth interface unit of the dock is not connected with the first external power source after the host is in communication connection with the dock, the EC unit controls the battery to supply power and controls the CPU master control unit to be in the dormant or sleep mode. The EC unit monitors a power state of the system in real time, and when a power voltage cannot meet normal work, the battery is switched to supply power, and the host is controlled to enter the dormant or sleep mode.

When there is no external power source for supplying power or the power voltage cannot meet a demand for electric power of the computer architecture system, the EC unit cuts off the power output to the host, the battery supplies power to the CPU master control unit, and the CPU master control unit is controlled to be in the dormant or sleep mode, so that not only can the power loss caused by restarting the host when the application scenarios are switched be avoided to achieve energy conservation and environment protection effects, but also the safety is also guaranteed when the host is in hot swapping/plugging connection with the dock. Preferably, the host further includes a second interface unit connected to the CPU master control unit and configured to be connected to a second external power source.

Specifically, if the host is not in communication connection with the dock, and it is monitored by the EC unit that the host is connected with a second external power source, at the moment, the EC unit controls the second external power source to supply power to the host and be capable of charging the battery; and if the second interface unit of the host is connected with the second external power source and the fourth interface unit of the dock is not connected with the first external power source after the host is in communication connection with the dock, at the moment, the EC unit controls the second external power source to supply a working voltage to the host and the dock and be capable of charging the battery.

If the second interface unit of the host is not connected with the second external power source and the fourth interface unit of the dock is connected with the first external power source after the host is in communication connection with the dock, at the moment, the EC unit controls the first external power source to supply the working voltage to the host and the dock and be capable of charging the battery.

If the second interface unit of the host is connected with the second external power source and the fourth interface unit of the dock is connected with the first external power source after the host is in communication connection with the dock, at the moment, the EC unit controls the first external power source or the second external power source to supply a working voltage to the host and the dock and be capable of charging the battery.

Preferably, if the second interface unit of the host is connected with the second external power source and/or the fourth interface unit of the dock is connected with the first external power source and input voltages of the external power sources are lower than the working voltage after the host is in communication connection with the dock, the EC unit controls the CPU master control unit to be in the dormant or sleep mode.

The host is additionally provided with a power interface, by which the application scenarios of the system are enriched, and the use experience is enhanced. Furthermore, when there is no external power source for supplying power or the power voltage cannot meet a demand for electric power of the computer architecture system, the power output to the host is cut off, the battery supplies power to the CPU master control unit, and the CPU master control unit is controlled to be in the dormant or sleep mode, so that not only can the power loss caused by restarting the host when the application scenarios are switched be avoided to achieve energy conservation and environment protection effects, but also the safety is also guaranteed when the host is in hot swapping/plugging connection with the dock.

On the basis of the above-mentioned novel computer architecture system, an embodiment of the present disclosure further provides a control method for a novel computer architecture system. As shown in FIG. 2, the control method includes:

when monitoring a level signal of a first interface unit, an EC unit sends dock identity request information;

a second communication unit acquires the dock identity request information and sends dock identity information;

the EC unit acquires the dock identity information, and calls and configures corresponding communication protocols according to the dock identity information;

after the configuration for the communication protocols is completed, the EC unit controls a CPU master control unit to be in communication connection with a dock master control unit; and the EC unit monitors a power voltage state of a host and/or a dock in real time, and controls and adjusts an operating state of the host according to the power voltage state.

Exemplarily, four corresponding positioning PINs are disposed in a connector adopted by a first interface unit of the host and a third interface unit of the dock. When the first interface unit and the third interface unit are connected in place, the positioning PINs may generate the first level signal. After acquiring the first level signal, the EC unit sends the dock identity request information to a second communication unit of the dock by the first interface unit and the third interface unit. After receiving the dock identity request information, the second communication unit sends the dock identity information to the EC unit. The EC unit acquires the dock identity information, recognizes and determines the type of the dock and calls corresponding communication protocols according to the type of the dock to perform configuration. After the configuration of the communication protocols is completed, the EC unit controls the CPU master control unit to be in communication connection with a dock master control unit to achieve information interaction. The first level signal belongs to a low-level signal.

According to the present disclosure, by storing the various communication protocols in the EC unit, various docks may be rapidly recognized and are in communication connection. Application scenarios are enriched, and the experience is enhanced. Furthermore, power voltage states of the host and the dock are monitored while the host is in communication connection with the dock, so that an operating state of the host is adjusted in time. The power utilization efficiency and safety of the computer architecture system are improved.

Specifically, the step that an operating state of the host is controlled and adjusted according to the power voltage state includes:

if the host is not in communication connection with the dock, the EC unit controls a battery to supply power, and controls the CPU master control unit to be in a dormant or sleep mode;

if the host is in communication connection with the dock, and it is monitored by the EC unit that the dock is connected with the first external power source, at the moment, the EC unit controls the first external power source to supply power to the host and be capable of charging the battery; and if the host is in communication connection with the dock, and it is monitored by the EC unit that the dock is not connected with the first external power source, at the moment, the EC unit controls the battery to supply power to the host, cuts off power output to the dock, and controls the CPU master control unit to be in the dormant or sleep mode.

Preferably, the step that an operating state of the host is controlled and adjusted according to the power voltage state further includes:

if the host is not in communication connection with the dock, and it is monitored by the EC unit that the host is connected with a second external power source, at the moment, the EC unit controls the second external power source to supply power to the host and be capable of charging the battery;

if the host is in communication connection with the dock, and it is monitored by the EC unit that the host is connected with the second external power source and the dock is not connected with the first external power source, at the moment, the EC unit controls the second external power source to supply power to the host and the dock and be capable of charging the battery;

if the host is not connected with the second external power source and the dock is connected with the first external power source after the host is in communication connection with the dock, at the moment, the EC unit controls the first external power source to supply power to the host and the dock and be capable of charging the battery; and if the host is connected with the second external power source and the dock is connected with the first external power source after the host is in communication connection with the dock, at the moment, the EC unit controls the first external power source or the second external power source to supply power to the host and the dock and be capable of charging the battery.

Further preferably, if the host is in communication connection with the dock, and it is monitored by the EC unit that the host is connected with the second external power source and/or the dock is connected with the first external power source and output voltages of all the external power sources are lower than a working voltage, the EC unit controls the battery to supply power to the host, cuts off power output to the dock, and controls the CPU master control unit to be in the dormant or sleep mode.

The EC unit monitors a power state of the system in real time, and when a power voltage cannot meet normal work, the battery is switched in time to supply power, and the host is controlled to enter the dormant or sleep mode, so that not only can the power loss caused when the host is restarted be avoided to achieve energy conservation and environment protection effects, but also the safety is also guaranteed when the host is connected with the dock. Furthermore, when an input voltage of the system is lower than the working voltage, it shows that input voltages of the external power sources cannot meet a demand for the power of the device in the system, the CPU master control unit is controlled to be in the dormant or sleep mode, so that the power loss is further reduced.

It should be noted that the working voltage in the embodiment of the present disclosure refers to a voltage required when the host and/or the dock and/or the external device normally operates. A numeral value of the working voltage is not limited herein.

Although the present disclosure has been described in detail with reference to the aforementioned embodiments, it should be understood by those of ordinary skill in the art that they may still modify the technical solutions recorded in each of the aforementioned embodiments or equivalently substitute parts of technical features therein. These modifications or substitutions do not make the essences of the corresponding technical solutions depart from the spirits and scopes of the technical solutions of all the embodiments of the present disclosure.

The invention claimed is:

1. A novel computer architecture system, the computer architecture system comprising a host, wherein the host comprises a CPU master control unit, an EC (embedded controller) unit, a first interface unit and a battery;

the EC unit is electrically connected to the CPU master control unit and the first interface unit, respectively; and the battery is electrically connected to the CPU master control unit;

the CPU master control unit is configured to acquire input data and perform calculation processing according to the input data to generate output data; and send the output data;

the EC unit is configured to receive a first level signal and send dock identity request information; and acquire and recognize dock identity information, and call and configure communication protocols according to the dock identity information;

the first interface unit is configured to be connected to a dock to perform data and/or power signal transmission; and the battery is configured to supply a temporary working voltage to the host.

2. The novel computer architecture system according to claim 1, wherein the computer architecture system further comprises the dock;

the dock comprises a second communication unit, a dock master control unit, a third interface unit and a fourth interface unit; the third interface unit, the second communication unit, the dock master control unit and the fourth interface unit are electrically connected in sequence;

the third interface unit is configured to be connected to the first interface unit of the host to perform data and/or power signal transmission;

the second communication unit is configured to store the dock identity information; receive the dock identity information and send the dock identity information according to the dock identity request information;

the dock master control unit is configured to acquire an input signal, generate input data and send the input data according to the input signal; and receive output data, and generate and send an output signal according to the output data; and the fourth interface unit is configured to be connected to an external device to transmit the input signal and/or the output signal and/or the power voltage.

3. The novel computer architecture system according to claim 2, wherein the external device comprises one or more of a first external power source, a mouse, a keyboard, a display and an audio.

4. The novel computer architecture system according to claim 1, wherein the EC unit comprises a protocol storage unit and a first communication unit;

the protocol storage unit is electrically connected to the first communication unit, and the first communication unit is connected to the first interface unit and the CPU master control unit, respectively;

the protocol storage unit is configured to store the communication protocols; and the first communication unit is configured to acquire and recognize the dock identity information, and call and configure the communication protocols according to the dock identity information.

5. The novel computer architecture system according to claim 2, wherein the EC unit is further configured to monitor a power voltage state of the host and/or the dock in real time; and control and adjust an operating state of the host according to the power voltage state.

6. The novel computer architecture system according to claim 5, wherein the host further comprises a second interface unit connected to the CPU master control unit and configured to be connected to a second external power source.

7. A control method for a novel computer architecture system, wherein the control method comprises:

when monitoring a level signal of a first interface unit, sending, by an EC (embedded controller) unit, dock identity request information;

acquiring, by a second communication unit, the dock identity request information, and sending dock identity information;

acquiring, by the EC unit, the dock identity information, and calling and configuring corresponding communication protocols according to the dock identity information;

after the configuration for the communication protocols is completed, controlling, by the EC unit, a CPU master control unit to be in communication connection with a dock master control unit; and monitoring, by the EC unit, a power voltage state of a host and/or a dock in real time, and controlling and adjusting an operating state of the host according to the power voltage state.

8. The control method for a novel computer architecture system according to claim 7, wherein the step of controlling and adjusting an operating state of the host according to the power voltage state comprises:

if the host is not in communication connection with the dock, controlling, by the EC unit, a battery to supply power, and controlling the CPU master control unit to be in a dormant or sleep mode;

if the host is in communication connection with the dock, and it is monitored by the EC unit that the dock is connected with a first external power source, at the moment, controlling, by the EC unit, the first external power source to supply power to the host and be capable of charging the battery; and if the host is in communication connection with the dock, and it is monitored by the EC unit that the dock is not connected with the first external power source, at the moment, controlling, by the EC unit, the battery to supply power to the host, cutting off power output to the dock, and controlling the CPU master control unit to be in the dormant or sleep mode.

9. The control method for a novel computer architecture system according to claim 8, wherein the step of controlling and adjusting an operating state of the host according to the power voltage state comprises:

if the host is not in communication connection with the dock, and it is monitored by the EC unit that the host is connected with a second external power source, at the moment, controlling, by the EC unit, the second external power source to supply power to the host and be capable of charging the battery;

if the host is in communication connection with the dock, and it is monitored by the EC unit that the host is connected with the second external power source and the dock is not connected with the first external power source, at the moment, controlling, by the EC unit, the second external power source to supply power to the host and the dock and be capable of charging the battery;

if the host is not connected with the second external power source and the dock is connected with the first external power source after the host is in communication connection with the dock, at the moment, controlling, by the EC unit, the first external power source to supply power to the host and the dock and be capable of charging the battery; and if the host is connected with the second external power source and the dock is connected with the first external power source after the host is in communication connection with the dock, at the moment, controlling, by the EC unit, the first external power source or the second external power source to supply power to the host and the dock and be capable of charging the battery.

10. The control method for a novel computer architecture system according to claim 9, wherein the step of controlling and adjusting an operating state of the host according to the power voltage state comprises:

if the host is in communication connection with the dock, and it is monitored by the EC unit that the host is connected with the second external power source and/or the dock is connected with the first external power source and output voltages of all the external power sources are lower than a working voltage, controlling, by the EC unit, the battery to supply power to the host, cutting off power output to the dock, and controlling the CPU master control unit to be in the dormant or sleep mode.

* * * * *